United States Patent
Herzog

(10) Patent No.: US 6,707,192 B2
(45) Date of Patent: Mar. 16, 2004

(54) ELECTRIC MOTOR WITH BRAKES

(75) Inventor: Hans-Georg Herzog, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/276,426

(22) PCT Filed: Mar. 5, 2002

(86) PCT No.: PCT/DE02/00802

§ 371 (c)(1),
(2), (4) Date: Nov. 15, 2002

(87) PCT Pub. No.: WO02/084846

PCT Pub. Date: Oct. 24, 2002

(65) Prior Publication Data

US 2003/0132682 A1 Jul. 17, 2003

(30) Foreign Application Priority Data

Apr. 11, 2001 (DE) .......................... 101 18 035

(51) Int. Cl.⁷ ........................... H02K 7/102; H02K 1/08
(52) U.S. Cl. ........................ 310/77; 310/50; 188/161; 188/251 A
(58) Field of Search ................................ 188/161, 163, 188/164, 251 A; 310/50, 77, 83; 428/611, 928

(56) References Cited

U.S. PATENT DOCUMENTS

| 3,668,445 A | * | 6/1972 | Grove ......................... 310/77 |
| 3,848,313 A | * | 11/1974 | Guyonnet ................... 428/555 |
| 4,544,048 A | * | 10/1985 | Hoffman ................. 188/251 A |
| 5,087,845 A | * | 2/1992 | Behrens et al. ................ 310/77 |
| 5,444,318 A | * | 8/1995 | Stumpf ........................ 310/77 |
| 5,677,586 A | * | 10/1997 | Horst ......................... 310/103 |
| 6,326,710 B1 | * | 12/2001 | Guenther et al. ............. 310/77 |

FOREIGN PATENT DOCUMENTS

| DE | 24 01 846 A | 7/1974 | ............. H02P/3/04 |
| DE | 197 37 239 A | 3/1999 | .......... H02K/7/102 |
| DE | 198 60 396 A | 6/2000 | .......... H02K/7/102 |

* cited by examiner

Primary Examiner—Burton Mullins
(74) Attorney, Agent, or Firm—Michael J. Striker

(57) ABSTRACT

In an electric motor, in at least one of its pole shoes (15) belonging to the stator (11), there is a brake element (23), which is movable in the direction of the rotor (12) and which at its point that can be placed on the rotor (12) is provided with a brake lining (31). Because the brake lining (31) has approximately the same magnetic conductivity as the pole shoe (15) and the brake element (23) inserted into it, this brake lining (31) forms a slight magnetic resistance, thus preventing an exaggeration of the idling rpm of the electric motor.

12 Claims, 1 Drawing Sheet

ELECTRIC MOTOR WITH BRAKES

BACKGROUND OF THE INVENTION

The present invention relates to an electric motor, in particular for power tools, whose stator has at least one pole shoe covering a portion of the rotor, and a brake element that is movable in the direction of the rotor is disposed in the pole shoe and is provided with a brake lining.

Particularly in power tools, such as angle grinders, circular saws, and the like, after the motor current is switched off, the rundown times are sometimes quite long, because of a rotational energy stored in the rotating tool.

The tool is still rotating after being switched off presents a risk of injury to the user. To reduce the rundown times of power tools, it is known, for instance from German Patent Disclosure DE 198 60 396 A1 to provide a brake element in the electric motor, which develops a braking action on the rotor as soon as the current to the engine has been switched off. A very space-saving braking device which achieves good braking action is the subject of German Patent Disclosure DE 198 60 396 A1. This known braking device comprises a brake element, embodied as a rocker, which is suspended in a radially continuous free space in a pole shoe of the stator of the motor. With this kind of brake element embodied as a rocker, a very high braking force acting on the rotor can be generated because of the leverage of the rocker. The brake element has a brake lining. According to DE 198 60 396 A1, this brake lining should comprise a material with no, only a very slight, magnetic conductivity. This kind of brake lining, located in the air gap between the rotor and the stator of the motor, presents a strong magnetic resistance, compared to the pole shoe, and this attenuates the magnetic flux in the air gap. The consequence is a relatively high idling rpm of the motor, yet this is especially unwanted in power tools and with a long tool radius, such as in angle grinders. To reduce the idling rpm, steps would have to be taken that would reduce the power of the motor, which is once again unwanted.

SUMMARY OF THE INVENTION

In an electric motor of the invention, the brake element is provided with a brake lining, which has approximately the same magnetic conductivity as the pole shoe and the brake element inserted into it. As a result, in the air gap between the stator and the rotor of the motor, the brake lining does not present any increased magnetic resistance that impairs the exciter flux. Hence an unwanted high idling rpm of the motor also is averted.

The brake lining advantageously comprises a substrate material filled with iron powder.

It is expedient that the brake element is embodied as a rocker, which is suspended in a radially continuous free space in the pole shoe. By the leverage of the rocker, a strong braking force for the rotor of the motor can be generated. The free space is preferably defined axially by a respective rib.

The brake element is supported pivotably about a pivot shaft within limits relative to the stator, and the pivot shaft is located parallel to an axis of rotation of the rotor. The brake element can be provided laterally with one peg each, which engages respective recesses of the ribs and forms the pivot shaft.

It is expedient that the brake element is embodied as a multi-armed lever, with a braking arm and a disengagement arm, and the braking arm is subjected to a braking force and the disengagement arm, when current is supplied to the stator winding, exerts a disengagement force, oriented counter to the braking force, on the brake element.

Preferably, a parting face between the disengagement arm and the pole shoe has a greater radial spacing from the pivot shaft than a parting face between the braking arm and the pole shoe.

In an advantageous embodiment, the braking arm has at least one blind bore, which serves to receive a compression spring, and the compression spring is advantageously braced on a brace secured to the stator.

Vibration of the braking device when the stator controller is supplied with current can advantageously be prevented by providing that a short-circuit winding is integrated into the disengagement arm of the brake element.

DESCRIPTION OF THE DRAWINGS

The invention will be described in further detail below in conjunction with an exemplary embodiment shown in the drawing. Shown are.

DESCRIPTION OF THE PREFERRED EMBODIMENTS

Figure 1:
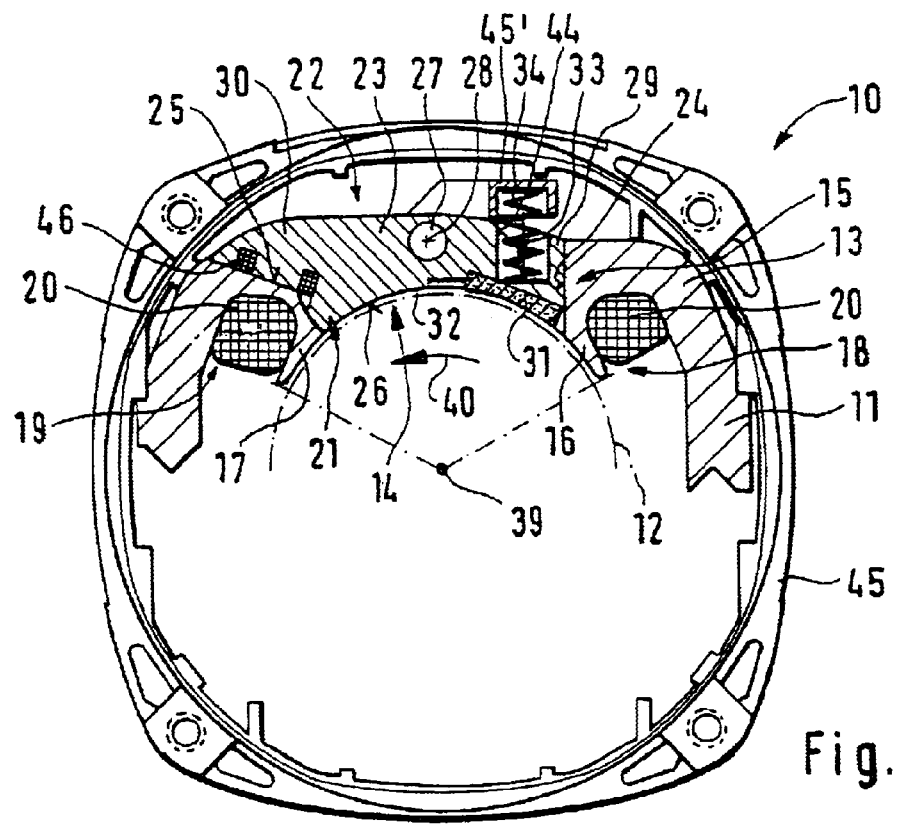
FIG. 1, a fragmentary section through an electric motor.

In FIG. 1, a cross section is shown through an electric motor 10 which has a stator 11 and a rotor 12. The stator, of which only an upper half is shown, forms a pole pair, of which one pole is marked 14. The pole 14 has a pole shoe 15, which is oriented inward toward the rotor circumference from a yoke 13 and ends on both sides in pole horns 16, 17. Between the pole horns and the yoke 13, there are recesses 18, 19, in which a stator winding 20 is located. The stator winding 20 thus surrounds the pole shoe 15.

In the stator 11, a radially continuous free space 21 is formed in the region of the pole shoe 15, and a brake element 23 of a braking device 22 is inserted into it. The brake element 23 fills up an interior of the pole shoe 15 between the pole horns 16, 17 and thus is part of the pole shoe 15. The brake element 23 forms lateral parting faces 24, 25, which are radially continuous relative to the stator 11, and one pole face 26 oriented toward the rotor 12. The brake element 23 comprises material with good magnetic conductivity, so that a magnetic flux generated by the stator winding 20 in the stator 11 propagates virtually undamped via the parting faces 24, 25 and the pole face 26 that with the rotor forms an air gap.

The brake element 23 is preferably embodied as a rocker, which on each of its sides remote from one another has a respective axially protruding peg 27. The two pegs 27 form a pivot shaft 28, about which the brake element 23 is supported pivotably within limits relative to the pole shoe 15 of the stator 11. The brake element 23 is embodied as a two-armed lever, with lever arms 29 and 30 disposed to both sides of the pivot shaft 28. One of the two lever arms 29, 30 forms a braking arm 29, which on its inside toward the rotor 12 has a brake lining 31. The other lever arm 30 forms a disengagement arm, which in the region of the pole face 26 forms an air gap with the rotor 12.

The brake lining 31 comprises a material that has approximately the same magnetic conductivity as the pole shoe 15 and the brake element 23 inserted into it. Such a brake lining does not increase the magnetic resistance of the brake element and hence also does not reduce the magnetic flux from the stator to the rotor. An unwanted increase in the idling rpm of the motor is thus prevented. It is in fact precisely in power tools, especially tools with a large diameter (such as angle grinders), that an increased idling rpm is unwanted. A brake lining with good magnetic conductivity can be created for instance by filling a substrate material with iron powder. The substrate material should be as abrasion-resistant as possible and should be highly heat-resistant. A material with a negative temperature coefficient is advantageous, so that as the temperature increases, the coefficient of friction of the brake lining 31 drops.

A compression spring 34 urges the braking arm 29, with a braking force 33, in the direction of the rotor 12. The brake element 23 is thus subjected to the braking force 33 outside the pivot shaft 28, or in other words eccentrically, and as a result a braking moment about the pivot shaft 28 is generated. The pivot shaft 28 is located parallel to an axis of rotation 39 of the rotor 12. The braking arm 29 has at least one blind bore 44, which serves to receive a compression spring 34. The compression spring 34 is braced on a brace 45' secured to the stator 11.

The braking arm 29 of the brake element 23 is disposed before the pivot shaft 28, in terms of a direction of rotation of the rotor 12 as indicated by an arrow 40, while conversely the disengagement arm 30 is located after the pivot shaft 28. As a result of this leverage of the brake element 23 embodied as a rocker, a strong braking action is created, because specifically a pair of forces comprising a frictional force and a bearing reaction force forms a torque about the pivot shaft 28 in the direction of the braking force 33.

If the electric motor 10 is turned on, that is, if current is supplied to the stator winding 20, a magnetic flux is induced in the stator 11 and in the parting face 25 between the brake element 23 and the pole shoe 15 and also in the pole face 26 of the brake element 23 toward the rotor 12, this flux generates a force of attraction on the brake element 23. This force of attraction causes a disengagement moment, which is oriented counter to the braking moment originating in the compression spring 34 and is quantitatively higher and brings about a disengagement motion of the brake element 23 counter to the braking moment. To that end, there is sufficient play of motion in the parting faces 24, 25 between the brake element 23 and the pole shoe 15 to enable the brake element 23 to execute a limited pivoting motion relative to the stator 11 about the pivot shaft 28, whereupon the brake lining 31 is lifted from the rotor 12. The parting face 25 on the disengagement arm 30 has a greater radial spacing from the pivot shaft 28 than the parting face 24 on the braking arm 29, so that the force of attraction operative in the parting face 24 makes a particularly large contribution to the disengagement moment. Since the braking arm 29 in the region of the pole face 26 has a greater spacing from the rotor 12 than the disengagement arm 30, considerably lesser forces of attraction are present at this point, in contrast to the disengagement arm 30. To prevent a vibration, dependent on the frequency of the mains voltage, of the braking device 22 when current is supplied to the stator winding 20, there is a short-circuit winding 46 in the disengagement arm 30, in the immediate vicinity of the parting face 25. However, the rotor 12 can also have a direction of rotation opposed to the arrow 40.

If the electric motor 10 is switched off again, the magnetic effect of the stator winding 20 ebbs, so that the force of attraction at the disengagement arm 30 in the parting plane 25 and in the pole face 26 ebbs as well. The braking moment then predominates again, so that the braking arm 29 with the brake lining 31 is pressed against the rotor 12 by the compression spring 34, thus braking the rotor 12. Therefore upon shutoff of the electric motor 10, the braking device 22 automatically shuts off as well, so that for instance in an angle grinder the rundown of the cutting disk after the motor is switched off stops automatically after only a brief time. The stator 11, only half of which is shown in FIG. 1, has a further pole in the lower half that is not shown, and this pole can likewise be provided with a braking device. With a further braking device in the second pole, the braking effect can be enhanced still further.

Figure 2:
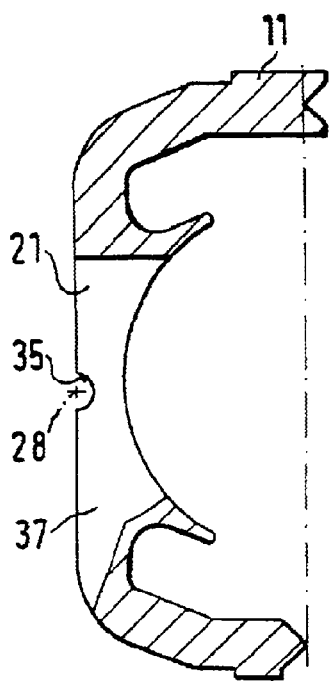
FIG. 2, a section through one half of the stator, without a brake element inserted into it.
Figure 3:
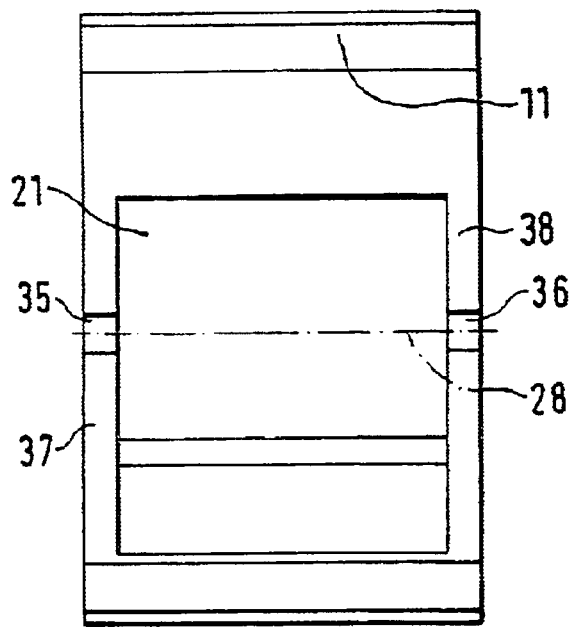
FIG. 3, a plan view on the stator of the electric motor.

In FIG. 2, the upper half of the stator 11 of FIG. 1 is shown, without the brake element 23 to be inserted into it. It can be seen that the free space 21 is not embodied as axially continuous, but instead is limited axially by a respective rib 37, 38 with continuous stator material. The free space 21 is thus embodied in the form of a window, which can be seen even more clearly in FIG. 3 in a plan view on the stator. The ribs 37, 38 are each provided with semicircular recesses 35, 36, which serves as a support for the pegs 27 of the rocker-like brake element 23. In this way, the pivot shaft 28 is formed.

The invention is not limited solely to the exemplary embodiment shown. For instance, the braking device of the invention can also be used in electric motors with more than two poles. The braking force can also engage the brake lining directly, or the component supporting it, in which case the brake element then serves as a disengagement rocker that is coupled to the brake lining or to the components supporting it. As the compression spring, one or more leaf spring metal sheets can be used, which are secured to the pole shoe 15 or the stator 11 and generate the requisite braking force.

The use of the brake lining of the invention is not limited solely to a rocker-like brake element as described above, either. The brake element can also be supported in the stator 11 in such a way that it executes a radial motion relative to the rotor axis 39.

What is claimed is:

1. An electric motor, in particular for power tools, whose stator (11) has at least one, pole shoe (15) covering a portion of the rotor (12), and a brake element (23) that is movable in the direction of the rotor (12) is disposed in the pole shoe (15) and is provided with a brake lining (31), wherein the brake lining (31) has approximately the same magnetic conductivity as the pole shoe (15) and the brake element (23).

2. The electric motor of claim 1, wherein the brake lining (31) is a substrate material filled with iron powder.

3. The electric motor of claim 1, wherein brake element (23) is embodied as a rocker and which is suspended in a radially continuous free space (21) in the pole shoe (15).

4. The electric motor of claim 3, wherein the free space (21) is defined axially by a respective rib (37, 38).

5. The electric motor of claim 4, wherein the brake element (23) is supported pivotably about a pivot shaft (21) within limits relative to the stator (11).

6. The electric motor of claim 5, wherein the pivot shaft (28) is located parallel to an axis of rotation (39) of the rotor (12).

7. The electric motor of one of the foregoing claims, wherein the brake element (23) is provided laterally with one peg (27) engaging respective recesses (35,36) of the ribs (37, 38) and forming the pivot shaft (28).

8. The electric motor of claim 1, wherein the brake element (23) is embodied as a multi-armed lever, with a braking arm (29) and a disengagement arm (30), and the braking arm (29) is subjected to a braking force and the disengagement arm (30), when current is supplied to the stator winding (20), exerts a disengagement force, oriented counter to the braking force, on the brake element (23).

9. The electric motor of claim 8, wherein a parting face (25) between the disengagement arm (30) and the pole shoe (15) has a greater radial spacing from the pivot shaft (28) than a parting face (24) between the braking arm (29) and the pole shoe (15).

10. The electric motor of claim 8, wherein a short-circuit winding (43) is integrated into the disengagement arm (30) of the brake element (23).

11. The electric motor of claim 1, wherein the braking arm (29) has at least one blind bore (41), which serves to receive a compression spring (34).

12. The electric motor of claim 11, wherein the compression spring (34) is braced on a brace (45') secured to the stator (11).

* * * * *